United States Patent Office 2,759,920
Patented Aug. 21, 1956

2,759,920

PREPARATION OF PHOSPHORUS SULFIDE-HYDROCARBON REACTION PRODUCTS

Roger W. Watson, Highland, Ind., and Morton Fainman, Chicago, Ill., assignors to Standard Oil Company, Chicago, Ill., a corporation of Indiana No Drawing. Application December 22, 1950,
Serial No. 202,410

16 Claims. (Cl. 260—139)

The present invention is directed to improvements in the preparation of neutralized reaction products of a phosphorus sulfide and an olefin hydrocarbon, and more particularly is directed to the preparation of neutralized reaction products of a phosphorus sulfide and an olefin polymer substantially free of salts of inorganic phosphorous acids, which product is adapted for use as a lubricant additive.

It has heretofore been found that certain reaction products of a phosphorus sulfide and a hydrocarbon, particularly an olefin or an olefin polymer, when added in small amounts to a hydrocarbon oil, such as mineral oil, is effective in inhibiting the formation of sludge, and/or varnish-like deposits on the valves, piston rings, etc., of internal combustion engines in which they are employed. These additives are the subject matter of United States Patents Nos. 2,316,080 and 2,316,082, issued to Clarence M. Loane and James W. Gaynor April 6, 1943. While lubricant additives of the type described in these patents have proven very satisfactory for use under most conditions, it has recently been observed in some cases that when used in internal combustion engines operating under unusually high temperature conditions and/or used in internal combustion engines, particularly diesel engines, employing motor fuels of high sulfur content, undesirable wear and engine deposits have been encountered. While these difficulties appear to be the exception rather than the rule, steps were taken to overcome such difficulties. It was found that a contributory factor was the presence of relatively large amounts of salts of inorganic phosphorus acids formed in the hydrolysis of the reaction products of the phosphorus sulfide and the hydrocarbon.

It is an object of the present invention to provide a method of preparing neutralized reaction products with a phosphorus sulfide and a hydrocarbon substantially free of salts of inorganic phosphorus acids. Still another object of the invention is to provide an improved method of removing salts of inorganic phosphorus acids from neutralized reaction products of a phosphorus sulfide and an olefin polymer. Still another object of the invention is to provide a neutralized reaction product of a phosphorus sulfide and an olefin hydrocarbon which is substantially free of salts of inorganic phosphorus acids.

In the preparation of the reaction product of a phosphorus sulfide and a hydrocarbon, hydrolysis takes place with the resultant formation of inorganic phosphorus acids, which upon neutralization, produced salts of such inorganic phosphorus acids. It has recently been found that the presence of salts of inorganic phosphorus acids in lubricant compositions containing as an additive the neutralized reaction products of a phosphorus sulfide and a hydrocarbon, caused excess wear, valve burning and other deleterious effects under certain operating conditions, particulary with diesel engines.

In accordance with the present invention neutralized products of a phosphorus sulfide and a normally liquid hydrocarbon, particularly olefin polymers substantially free of salts of inorganic phosphorus sulfide, particularly phosphorus pentasulfide, hydrolyzing the resultant reaction product at a temperature of from about 220° F. to about 500° F., and preferably from about 300° F. to about 375° F., treating the hydrolyzed reaction product with a basic alkaline earth compound, such as CaO, Ca(CO₃)₂, Ca(OH)₂, Ba(OH)₂, MgO, etc. The hydrolyzed reaction product of the phosphorus sulfide and the hydrocarbon is contacted with from about 1% to about 30%, and preferably from about 5% to about 20%, of the alkaline earth compound depending on the quantity of free acid present, at a temperature of from about 100° F. to about 500° F., and preferably from about 200° F. to about 400° F., until a sample of the treated material indicates the removal of substantially all of the inorganic phosphorus acids formed during the hydrolysis of the phosphorus sulfide-hydrocarbon reaction product. While the contacting time is not critical and can be varied, a contacting time of from about ¼ hour to about 20 hours and preferably from about ½ hour to about 8 hours, is sufficient to obtain the desired result.

Treatment of the hydrolyzed reaction product with the basic alkaline earth compound forms insoluble salts of the inorganic phosphorus acids which are precipitated and removed from the hydrolyzed reaction products. If desired the hydrolyzed product can be treated with an excess of the basic alkaline earth compound to form the corresponding salt of the phosphorus sulfide-hydrocarbon reaction product.

The hydrolyzed phosphorus sulfide-hydrocarbon reaction product, after treatment to remove the inorganic phosphorus acids, can be neutralized with a basic reagent such as a basic alkali metal compound or a basic alkaline earth compound such as, for example, sodium hydroxide, potassium hydroxide, lithium hydroxide, calcium hydroxide, barium hydroxide, calcium oxide, barium oxide, magnesium oxide or magnesium hydroxide, or heavy metal hydroxides, such as zinc hydroxide, tin hydroxide or basic nitrogen compounds such as ammonia, amines or quaternary alkyl ammonium hydroxides.

In the preparation of the phosphorus sulfide-hydrocarbon reaction product, the hydrocarbon is reacted with a phosphorus sulfide such as P₂S₃, P₄S₃, P₄S₇ or other phosphorus sulfides, and preferably phosphorus pentasulfide P₂S₅.

The hydrocarbon constituent of this reaction is preferably a monoolefin hydrocarbon polymer resulting from the polymerization of low molecular weight mono-olefinic hydrocarbons or isomono-olefinic hydrocarbons, such as propylenes, butylenes and amylenes, or the copolymers obtained by the polymerization of hydrocarbon mixtures containing isomono-olefins and monolefins of less than 6 carbon atoms. The polymers may be obtained by the polymerization of these olefins or mixtures of olefins in the presence of a catalyst, such as sulfuric acid, phosphoric acid, boron fluoride, aluminum chloride, or other similar halide catalysts of the Friedel-Crafts types.

The polymers employed are preferably monoolefin polymers or mixtures of monoolefin polymers and isomonoolefin polymers having molecular weights ranging from about 500 to about 50,000 or more, and preferably from about 600 to about 10,000. Such polymers can be obtained for example by the polymerization in the liquid phase of a hydrocarbon mixture containing monoolefins and isomono-olefins, such as butylene and isobutylene at a temperature of from about −80° F. to about 100° F., in the presence of a metal halide catalyst of the Friedel-Crafts type, such as for example, boron fluoride, aluminum chloride, and the like. In the preparation of these polymers we may employ for example a hydrocarbon mixture containing isobutylene, butylenes and butanes recovered from petroleum gases especially those gases produced in the cracking of petroleum oils in the manufacture of gasoline.

A suitable polymer for the reaction with phosphorus sulfide is the product obtained by polymerizing in the liquid phase a hydrocarbon mixture containing butylenes and isobutylene together with butanes and some C₃ and C₅ hydrocarbons at a temperature between about 0° F. and 30° F., in the presence of aluminum chloride. A suitable method for carrying out the polymerization is to introduce the aluminum chloride into the reactor and introduce the hydrocarbon mixture cooled to a temperature of about 0° F. into the bottom of the reactor and pass it upwardly through the catalyst layer while regulating the temperature within the reactor so that the polymer product leaving the top of the reactor is at a temperature of about 30° F. After separating the copolymer from the catalyst sludge and unreacted hydrocarbons the polymer is fractionated to obtain a fraction of the desired viscosity such as for example from about 80 seconds to about 2000 seconds Saybolt Universal viscosity at 210° F.

Another suitable polymer is that obtained by polymerizing in the liquid phase a hydrocarbon mixture comprising substantially C₃ hydrocarbons in the presence of an aluminum chloride-complex catalyst. The catalyst is preferably prepared by heating aluminum chloride with isooctane. The hydrocarbon mixture is introduced into the bottom of the reactor and passed upwardly through the catalyst layer while a temperature of from about 50° F. to about 110° F. is maintained in the reactor. The propane and other saturated gases pass through the catalyst while the propylene is polymerized under these conditions. The propylene polymer can be fractionated to any desired molecular weight, preferably from about 500 to about 1000 or higher.

Other suitable polymers are those obtained by polymerizing a hydrocarbon mixture containing about 10% to about 25% isobutylene at a temperature of from about 0° F. to about 100° F., and preferably 0° F. to about 32° F. in the presence of boron fluoride. After the polymerization of the isobutylene together with a relatively minor amount of the normal olefins present the reaction mass is neutralized, washed free of acidic substances and the unreacted hydrocarbons subsequently separated from the polymers by distillation. The polymer mixture so obtained, depending upon the temperature of reaction, varies in consistency from a light liquid to viscous, oily material and contains polymers having molecular weights ranging from about 500 to about 2000, or higher. The polymers so obtained may be used as such or the polymer may be fractionated under reduced pressure into fractions of increasing molecular weights and suitable fractions obtained reacted with the phosphorus sulfide to obtain the desired reaction products. The bottoms resulting from the fractionation of the polymer which may have Saybolt Universal viscosities at 210° F. ranging from about 50 seconds to about 10,000 seconds are well suited for the purpose of the present invention.

Essentially paraffinic hydrocarbons, such as bright stock residuums, lubricating oil distillates, petrolatums, or paraffin waxes may be used. There can also be employed the condensation products of any of the foregoing hydrocarbons usually through first halogenating the hydrocarbons with aromatic hydrocarbons in the presence of anhydrous inorganic halides such as aluminum chloride, zinc chloride, boron fluoride and the like.

Examples of high molecular weight olefinic hydrocarbons which can be employed as reactants are cetene (C₁₆), cerotene (C₂₆), melene (C₃₀), and mixed high molecular weight alkenes obtained by cracking petroleum oils.

Other preferred olefins suitable for the preparation of the hereindescribed phosphorus sulfide reaction products are olefins having at least 20 carbon atoms in the molecule of which from about 13 to about 18 carbon atoms, and preferably at least 15 carbon atoms are in a long chain. Such olefins can be obtained by the dehydrogenation of paraffins, such as by the cracking of paraffin waxes or by the dehalogenation of alkyl halides, preferably long chain alkyl halides, particularly halogenated paraffin waxes.

The olefins obtained by dehalogenation of long chain alkyl halides are preferably those obtained by dehydrohalogenation of monohalogenated waxes, such as for example, those obtained by dehydrochlorination of monochloroparaffin wax. The alkyl halides are decomposed to yield olefins according to the reaction $$C_nH_{2n+1}X \rightarrow HX + C_nH_{2n}$$

in which $n$ is a whole number, preferably 20 or more, and X is a halogen. It is preferred to employ paraffin waxes having at least about 20 carbon atoms per molecule, and melting points upwards from about 90° F. to about 140° F.

To obtain the halogenated paraffin wax, for example, chlorinated paraffin wax, chlorine is introduced into the wax maintained in a molten state until the wax has a chlorine content of from about 8% to about 15%. The chlorinated wax product is a mixture of unchlorinated wax, monochlorowax and polychlorowax. This chlorinated product may be used as such but is advantageous to use the substantially monochlorowax fraction. The monochlorowax fraction can be segregated from the unchlorinated wax and the polychlorowax fractions by taking advantage of the difference in the melting points of the various fractions since the melting point of the wax varies with the extent of chlorination, i. e. the melting point of the unchlorinated wax is greater than that of the monochlorowax and the melting point of the latter is greater than that of the polychlorowax. Thus, the monochloroparaffin wax can be separated from the unchlorinated and the polychloroparaffin wax fractions by means such as sweating, fractional distillation, solvent extraction, solvent precipitation and fractional crystallization.

The high molecular weight olefins are obtained by removing the halogen as hydrogen halide from the halogenated paraffin wax. For example, the corresponding olefin is obtained from the monochloro-paraffin by removing the chlorine from the latter as hydrogen chloride. The monochlorowax can be dehydrochlorinated by heating to a temperature of from about 200° F. to about 600° F. in the presence of a dehydrochlorinating agent, such as an alkali metal hydroxide or an alkaline earth metal hydroxide or oxide. Other alkaline inorganic or organic materials can also be used. The chlorine can also be removed from the chlorowax by heating the same for a prolonged period in the absence of any dehydrochlorinating agent. After the dehydrohalogenation has been completed the olefin so obtained can be further purified by removing the dehydrohalogenating agent by means of filtration or by other suitable means.

As a starting material there can be used the polymer or synthetic lubricating oil obtained by polymerizing the unsaturated hydrocarbon resulting from the vapor phase cracking of paraffin waxes in the presence of aluminum chloride which is fully described in U. S. Patents Nos. 1,955,260, 1,970,402 and 2,091,398. Still another type of olefin polymer which may be employed is the polymer resulting from the treatment of vapor phase cracked gasoline and/or gasoline fractions with sulfuric acid or solid adsorbents, such as fuller's earth, whereby unsaturated polymerized hydrocarbons are removed. Also contemplated within the scope of this invention is the treatment with phosphorus sulfide of the polymers resulting from the volatilization of hydrocarbons as described for example in U. S. Patents Nos. 2,197,768 and 2,191,787.

Also contemplated within the scope of the present invention are the reaction products of a phosphorus sulfide with an aromatic hydrocarbon, such as for example, benzene, naphthalene, toluene, xylene, diphenyl and the like, or with an alkylated aromatic hydrocarbon, such as for example, benzene having an alkyl substituent having at least four carbon atoms and preferably at least eight carbon atoms, such as a long chain paraffin wax.

In general the preparation of phosphorus sulfide-hydrocarbon reaction products in accordance with the present invention is carried out in the following manner:

The hydrocarbon, such as for example, an olefin polymer of the desired molecular weight, is reacted with from about 1% to about 50%, preferably from about 5% to about 25% of a phosphorus sulfide, e. g., $P_2S_5$, at a temperature of from about 200° F. to about 600° F., in a non-oxidizing atmosphere, such as for example, an atmosphere of nitrogen above the reaction mixture.

The phosphorus sulfide-hydrocarbon reaction can be carried out in the presence of a sulfurizing agent as described in U. S. 2,316,087 issued to J. W. Gaynor and C. M. Loane, April 6, 1943. The reaction mixture is then hydrolyzed by introducing steam through the reaction mass at a temperature of from about 220° F. to about 500° F., and preferably at a temperature of from about 300° F. to about 400° F. During the hydrolysis step it is desirable to control the evolution of heat by suitable means to maintain a temperature below about 420° F. Due to the formation of inorganic phosphorus acids and organic phosphorus acids formed by the hydrolysis the acidity of the hydrolyzed material is markedly increased, often reaching as much as 160 milligrams of KOH per gram of product, and higher.

The hydrolyzed reaction product is then contacted with the basic alkaline earth compound, e. g. lime in an amount at least sufficient just to precipitate the inorganic phosphorus acids; usually from about 2% to about 30% of the basic compound will be found effective. After being contacted for the desired length of time at the selected temperature, the mixture is filtered by a suitable means such as for example through a filter-press and a filtrate substantially free of inorganic phosphorus acids obtained.

The filtrate so obtained can be used as such for various purposes; however, for use as lubricant additives the filtrate should be neutralized with a suitable alkaline reagent, such as a hydroxide, oxide, carbonate, or sulfide of an alkali metal or alkaline earth metal, such as for example, sodium hydroxide, potassium hydroxide, lithium hydroxide, sodium carbonate, calcium oxide, calcium carbonate, barium oxide, barium hydroxide, sodium sulfide, etc. It is preferable to carry out the neutralization at a temperature of from about 100° F. to about 500° F., and preferably from about 220° F. to about 350° F., using stoichiometric amounts of the basic reagent.

The following examples are illustrative of the herein-described invention and are not intended as being indicative of the scope thereof.

Example I

The reaction product of a butylene polymer having a molecular weight of about 200 is reacted with 15% $P_2S_5$ at a temperature of about 400° F. and the reaction mixture diluted with an equal volume of an SAE 10 lubricating oil, the diluted reaction mixture is then hydrolyzed by steaming at a temperature of about 400° F. until no increase in acidity was obtained. The hydrolyzed reaction product had an acidity of 55 milligrams KOH per gram of product and a phosphorus content of 2.1%. The hydrolyzed product was then contacted with 30% calcium oxide for fifteen minutes at a temperature of about 410° F., and then filtered. The filtrate had an acidity of 21 milligrams KOH per gram of product and a phosphorus content of 1.33%, which was substantially all organic phosphorus.

Example II

A hydrolyzed product identical with that obtained in Example I is contacted with 40% calcium carbonate for fifteen minutes at a temperature of 410° F., and then filtered. A filtrate in this example had an acidity of 23 milligrams KOH per gram of product and a phosphorus content of 1.23%, which was substantially all organic phosphorus.

Similar results can be obtained by treating the hydrolyzed reaction products with other basic alkaline earth compounds, such as barium oxide, barium carbonate, strontium carbonate, magnesium oxide, etc. The removal of inorganic phosphorus acids by this means is unique in that similar results are not obtained by contacting the hydrolyzed reaction product with basic compound of the alkali metals. Treatment with basic compounds of the alkali metals may effect a similar phosphorus reduction but tend to remain in the product as peptized salts.

Percentages given herein and in the appended claims are weight percentages.

Copending application, Serial No. 202,409, filed December 22, 1950, by Roger W. Watson, now Pat. No. 2,688,612, claims the removal of inorganic acids of phosphorus from the hydrolyzed reaction product of a phosphorus sulfide and hydrocarbon by contacting the hydrolyzed product with a basic adsorbent material.

While we have described our invention by reference to specific embodiments thereof the same are given by way of illustration only and are not intended as defining the breadth of the invention which includes within its scope such modifications and variations as come within the spirit of the appended claims.

We claim:

1. In the preparation of an oil-soluble lubricant addition agent wherein a normally liquid hydrocarbon is reacted with about 1% to about 50% of a phosphorus sulfide at a temperature of from about 200° F. to about 600° F. and the resultant reaction product hydrolyzed at a temperature of from about 220° F. to about 500° F., whereby inorganic acids of phosphorus are formed, the improvement comprising contacting said hydrolyzed reaction product at a temperature of from about 100° F. to about 500° F. with a basic alkaline earth compound selected from the group consisting of an oxide, hydroxide and carbonate of calcium, barium and strontium in an amount sufficient to precipitate substantially only said alkaline earth salts of the inorganic acids of phosphorus formed by said hydrolysis, and removing said precipitated salts, whereby an oil-soluble reaction product of a phosphorus sulfide and a hydrocarbon substantially free of inorganic acids of phosphorus is obtained.

2. In the preparation of an oil-soluble lubricant addition agent wherein a normally liquid hydrocarbon is reacted with about 1% to about 50% of a phosphorus sulfide at a temperature of from about 200° F. to about 600° F., the resultant reaction product hydrolyzed at a temperature of from about 220° F. to about 500° F., whereby inorganic acids of phosphorus are formed, and the hydrolyzed reaction product neutralized with a basic reagent, the improvement comprising contacting said hydrolyzed reaction product at a temperature of from about 100° F. to about 500° F. with a basic alkaline earth compound selected from the group consisting of an oxide, hydroxide and carbonate of calcium, barium and strontium in an amount sufficient to precipitate substantially only said alkaline earth salt of the inorganic acids of phosphorus formed by said hydrolysis, separating said precipitate from the hydrolyzed reaction product, and neutralizing the treated hydrolyzed product with a basic reagent, whereby an oil-soluble neutralized reaction product of a normally liquid hydrocarbon and a phosphorus sulfide, substantially free of salts of inorganic acids of phosphorus, is obtained.

3. The method of claim 2 in which the basic alkaline earth compound is calcium oxide.

4. The method of claim 2 in which the basic alkaline earth compound is calcium carbonate.

5. The method of claim 2 in which the basic alkaline earth compound is calcium hydroxide.

6. The method of claim 2 in which the basic alkaline earth compound is barium oxide.

7. The method of claim 2 wherein the basic neutralizing agent is a basic alkali metal compound.

8. The method of claim 2 wherein the basic neutralizing agent is a basic potassium compound.

9. The method of claim 2 in which the basic neutralizing compound is a basic lithium compound.

10. The method of claim 2 in which the basic neutralizing agent is a basic alkaline earth compound.

11. The method of claim 2 in which the basic neutralizing agent is a basic calcium compound.

12. The method of claim 2 in which the basic neutralizing agent is a basic barium compound.

13. The method of claim 2 in which the basic neutralizing agent is a basic nitrogen compound.

14. In the preparation of an oil-soluble lubricant addition agent wherein an olefin polymer having a molecular weight of at least about 500 is reacted with about 1% to about 50% of a phosphorus sulfide at a temperature of from about 200° F. to about 600° F., the resultant reaction product hydrolyzed with steam at a temperature of from about 220° F. to about 500° F., whereby inorganic acids of phosphorus are formed, and the hydrolyzed reaction product neutralized with a basic reagent, the improvement comprising contacting said hydrolyzed reaction product at a temperature of from about 100° F. to about 500° F. with a basic alkaline earth compound selected from the group consisting of an oxide, hydroxide and carbonate of calcium, barium, and strontium in an amount sufficient to precipitate substantially only said alkaline earth salts of the inorganic acids of phosphorus formed by said hydrolysis, separating said precipitated salts of the inorganic phosphorus acids, and neutralizing the treated hydrolyzed product with a basic reagent, whereby an oil-soluble neutralized reaction product of a phosphorus sulfide and the olefin polymer, substantially free of salts of inorganic acids of phosphorus is obtained.

15. The method of claim 14 in which the olefin polymer is a butylene polymer.

16. The method of claim 14 in which the olefin polymer is a propylene polymer.

References Cited in the file of this patent

UNITED STATES PATENTS

| | | |
|---|---|---|
| 2,316,080 | Loane et al. | Apr. 6, 1943 |
| 2,316,082 | Loane et al. | Apr. 6, 1943 |
| 2,516,119 | Hersh | July 25, 1950 |
| 2,534,217 | Bartleson | Dec. 19, 1950 |
| 2,560,546 | Bartleson | July 17, 1951 |
| 2,560,547 | Bartleson | July 17, 1951 |
| 2,580,430 | Hughes et al. | Jan. 1, 1952 |